(12) United States Patent
Balko et al.

(10) Patent No.: US 8,381,206 B2
(45) Date of Patent: Feb. 19, 2013

(54) SYSTEM AND METHOD FOR EXTENDING COMPUTERIZED APPLICATIONS

(75) Inventors: Soren Balko, Weinheim (DE); Bernhard Drabant, Muhlhausen (DE); Erik Dick, Wiesloch (DE)

(73) Assignee: SAP AG, Walldorf (DE)

( * ) Notice: Subject to any disclaimer, the term of this patent is extended or adjusted under 35 U.S.C. 154(b) by 606 days.

(21) Appl. No.: 12/644,036

(22) Filed: Dec. 22, 2009

(65) Prior Publication Data

US 2011/0154312 A1    Jun. 23, 2011

(51) Int. Cl.
*G06F 9/44* (2006.01)
*G06F 3/00* (2006.01)

(52) U.S. Cl. .......................... 717/168; 719/331; 719/318

(58) Field of Classification Search .......... 717/168–172; 719/331, 318
See application file for complete search history.

(56) References Cited

U.S. PATENT DOCUMENTS

| | | | | |
|---|---|---|---|---|
| 5,933,645 | A * | 8/1999 | Wallack | 717/170 |
| 6,874,143 | B1 * | 3/2005 | Murray et al. | 717/173 |
| 6,883,168 | B1 * | 4/2005 | James et al. | 717/178 |
| 7,757,224 | B2 * | 7/2010 | Forin et al. | 717/157 |
| 7,844,978 | B2 * | 11/2010 | Tsuji et al. | 719/331 |
| 8,220,007 | B1 * | 7/2012 | Yeh et al. | 719/331 |
| 2005/0289535 | A1 * | 12/2005 | Murray et al. | 717/172 |
| 2006/0212864 | A1 * | 9/2006 | Calahan | 717/167 |
| 2007/0239985 | A1 * | 10/2007 | Bernabeu-Auban et al. | 713/168 |
| 2009/0300597 | A1 * | 12/2009 | George et al. | 717/173 |
| 2011/0154302 | A1 * | 6/2011 | Balko et al. | 717/140 |

* cited by examiner

*Primary Examiner* — Christopher B Shin

(57) ABSTRACT

The subject matter discloses a method for enabling computerized extensions, comprising receiving data concerning an extension required to a computerized application utilizing a process model, detecting an event received from the external entity and executing the computerized extension according to the event. The extension may be activated before after or during operation of the computerized application.

17 Claims, 3 Drawing Sheets

SYSTEM AND METHOD FOR EXTENDING COMPUTERIZED APPLICATIONS

TECHNICAL FIELD

The present disclosure relates to software extension in general, and to a method and system for enabling extension of software in runtime in particular.

BACKGROUND

Business application vendors deliver business applications that implement a number of business processes. The users or consumers of those applications adapt the business processes using a multitude of vastly different customization activities, such as changing technical configuration settings, adding fields to existing configuration databases tables, programming custom code, adding the code to the shipped code base and the like. In addition, application vendors typically document the corresponding business processes using formal or semi formal graphical process notations, such as event-driven process chains, BPMN-based process diagrams and the like. The process models abstract from technical details and solely serve documentation purposes that help the application customers to understand the contained business processes.

In many cases, business applications customers require modifications and additions to the existing functionality. Such additions require a technical expert experienced in the specific application or in a specific module to which the extension is to be added. Further, known methods of extending computerized process suffer various disadvantages. For example, they require a high level of expertise for the specific process and for the specific extension; such expertise is not always accessible at the user or consumer's end. The above-mentioned configuration is not related to existing documentation of the process and does not cope with the current process model. Lastly, the methods above are inconsistent, as there is more than one way to customize a business application or process.

SUMMARY

One aspect of the disclosure relates to a method for extending computerized applications, the method comprising receiving data concerning a computerized extension required by a computerized application and detecting an event received from an external entity. The method further comprises selecting a computerized extension to be executed according to the detected event from the external entity and the received data concerning a computerized extension: and executing the selected computerized extension.

In some embodiments, the computerized extension is executed after a computerized process used by the computerized application that requires the computerized extension is terminated. In some embodiments, the computerized extension is executed before operation of a computerized process used by the computerized application that requires the extension. In some embodiments, the computerized extension is executed during operation of a computerized process used by the computerized application that requires the extension.

In some embodiments, the computerized extension and the computerized application are formulated as business process models to overcome technical gaps between the computerized application and the computerized extension. In some embodiments, the external entity is a business application.

In some embodiments, the method further comprises a step of sending a request for the computerized extension to the external entity according to the received data concerning a computerized extension. In some embodiments, the method further comprises a step of receiving technical metadata concerning execution of the computerized extension, and applying said technical metadata in overcoming a technological gap between the computerized application and the computerized extension.

In some embodiments, the event is an extension point in the computerized application. In some embodiments, the method further comprises a step of receiving more than one potential computerized extensions and further comprises a step of matching the computerized extension to the event.

Another aspect of the disclosure relates to a system for enabling computerized extensions, comprising a first receiving module for receiving data concerning a computerized extension required by a computerized application; a first receiving module detecting an event that triggers the computerized extension; a selection unit for selecting a computerized extension to be executed according to the detected event and the received data concerning a computerized extension; and a running unit for executing the selected computerized extension.

Another aspect of the disclosure relates to a computer readable storage medium containing a set of instructions for a general purpose computer, the set of instructions comprising: receiving data concerning a computerized extension required by a computerized application; detecting an event received from an external entity; selecting a computerized extension to be executed according to the detected event from the external entity and the received data concerning a computerized extension; and executing the selected computerized extension.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The technical problem dealt with in the subject matter is to provide computerized extensions for computerized applications. Such extensions may rely on a process model that can be understood and formulated by non-technical users or consumers. Further another challenge is to formulate all extensions using the same mechanism and to overcome the heterogeneity of existing customization approaches. Such computerized applications may be software business applications, such as ERP. CRM. SCM software and the like.

The technical solution comprises a system and method for providing computerized extensions for computerized applications. The system comprises a receiving unit for receiving an event from another computerized application. The event represents the progress or state of the computerized application and is linked to process model documentation in a way that the event refers to a specific step or a plurality of steps in the process model. The system further comprises an extensibility framework for determining a computerized extension to be triggered according to the received event. The extensibility framework may further determine the time in which the computerized extension is used. Generally, the extensibility framework may evaluate rules which determine when to execute an extension upon receiving an event. The system may further comprise or is connected to a modeling mechanism for modeling computerized applications, more specifically for business process modeling.

Figure 1:
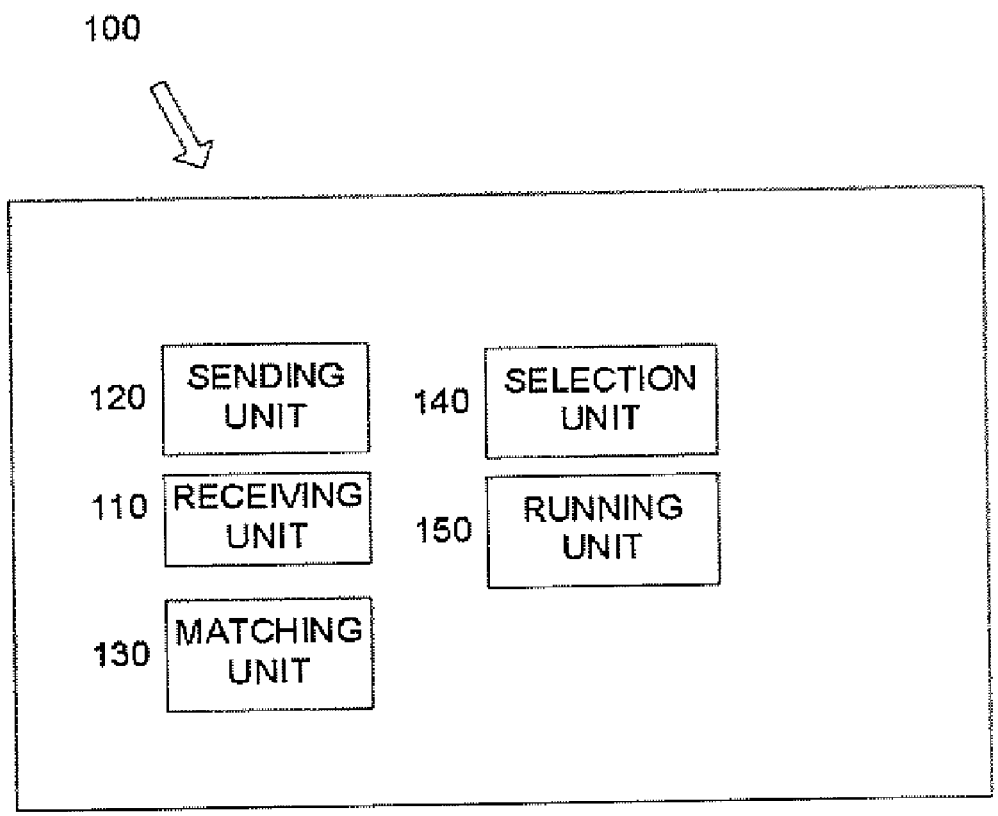
FIG. 1 shows a computerized system for enabling computerized extensions, according to exemplary embodiments of the disclosed subject matter.

FIG. 1 shows a computerized system for enabling computerized extensions, according to exemplary embodiments of the disclosed subject matter. The computerized system 100 may reside at a server or a client computerized entity. The computerized system 100 receives data concerning computerized extensions and provides a computerized extension at a specific time and location for a specific extension point. An extension point represents the combination of a business process model, such as a documentation of the business application that is to be extended, and an event associated to a specific step or multiple steps in that business process model.

Computerized system 100 comprises a receiving unit 110 for receiving information from external entities. The receiving unit 110 may receive data concerning events that trigger computerized extensions, data concerning the computerized extensions, data concerning computerized applications, computerized processes and the like. The computerized extensions may be added to computerized process models that document and represent the computerized applications. In some cases, the computerized processes are software or hardware implementations of processes required in a personal or business environment. The external entities may be servers using the computerized applications, client entities that receive the outcome of the applications, repositories that store the data and the like. In some cases, the receiving unit 110 comprises more than one receiving module. One receiving module is configured to receive data concerning extension processes are defined or modeled by the customer when desire to customize or extend a computerized application. Such definitions may later be deployed to the extensibility framework. Another receiving module or the receiving unit 110 is configured to receive events which are raised by the computerized applications upon reaching a certain progress within the corresponding process model, for example reaching an extension point.

The computerized system 100 further comprises a sending unit 120 for sending information to external entities. Transmission of the data may be performed wired or wirelessly. In some cases, transmission is performed in multicast or broadcast to more than one computerized entity that store data concerning the computerized extensions. The sending unit 120 may comprise a communication port, such as port 80.

The computerized system 100 further comprises a matching unit 130 for matching the received data concerning the desired extensions with data concerning possible extensions. For example, in case the user or administrator inputs data concerning generation of a specific report and transmission of that report. There are many extensions that perform generation of reports and transmission thereof. The matching unit 130 determines one or more of the possible extensions to be added to the process. The matching is transparent to the user of the computerized entity on which the application or process run. The matching unit may use business rules to determine which extension to execute upon receiving a certain event.

The computerized system 100 further comprises a selection unit 140 for selecting the extension to be used in case there are two or more possible extensions determined by the matching unit 130. In some cases, the selection unit 140 is a module within the matching unit 130.

The computerized system 100 further comprises a running unit 150 for running the selected extension on the process or application. The running unit may be, for example, a business process management suite. The running unit receives information concerning the location and timing in which the extension is to be used. The extension may be used after the original process ends. Alternatively, the extension can be used before the beginning of the original process. In some cases, the extension is activated in the middle of the process. The processes contain extension points known to the running unit 150. In some embodiments, the server running the processes completes a portion of the original process and asynchronously initiates an extension of another process or application while concurrently continues executing the original process until the original process hits a synchronization point or an extension point where the process waits for complete download of the extension. If the extension has not consistently completed, the original process asynchronously sends a message to roll back the extension. In another exemplary embodiment, the extension triggers another extension or another process after termination.

Figure 2:
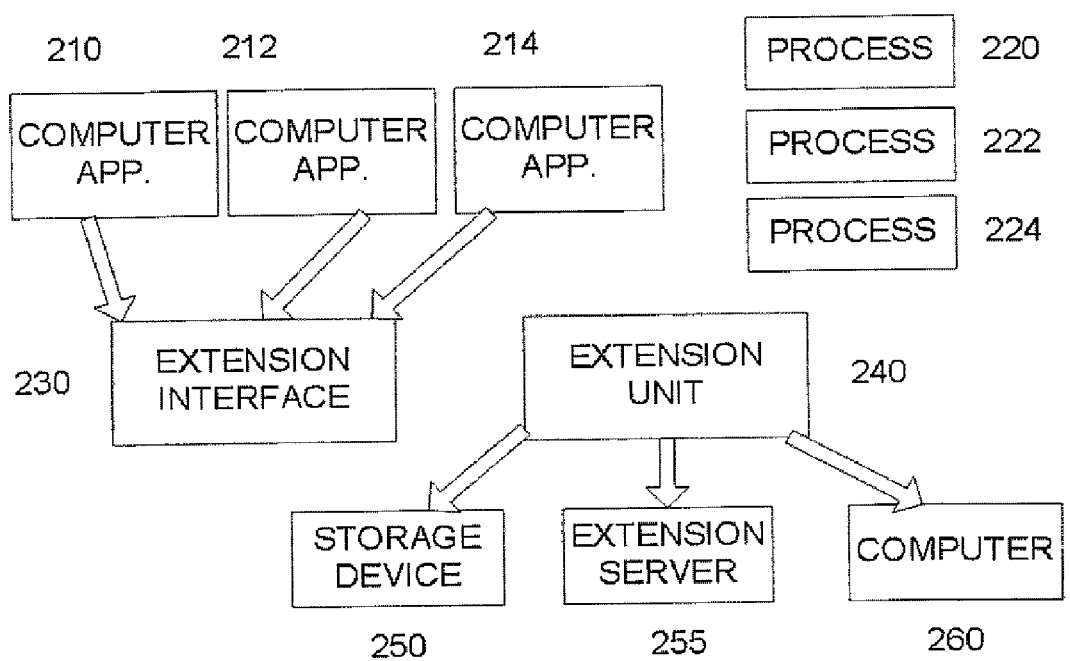
FIG. 2 shows a computerized environment in which computerized extensions are enabled, according to some exemplary embodiments of the subject matter; and, FIG. 3 shows a flow of a method for extending computerized processes, according to some exemplary embodiments of the disclosed subject matter.

FIG. 2 shows a computerized environment in which computerized extensions are enabled, according to some exemplary embodiments of the subject matter. The computerized environment that enables the extensions may be an adaptive backend server for performing this task and connected to a plurality of entities that use the applications and extensions. Alternatively, the method disclosed herein can be performed by an entity that further runs the processes themselves. In such case, the method is handled in a semi-distributed manner. Computerized environment 200 comprises a plurality of computerized applications 210, 212, 214. Such computerized applications may be business applications, entertainment applications, or other applications that require processes in order to operate. For example, computerized application 214 is modeled to computerized processes 220, 222, 224. The computerized processes may also contain the documentation of the computerized application 214. When a user or an operator of a computerized process wishes to extend the computerized process according to the disclosed subject matter, definitions of the extension are to be inputted into a user interface 230. In some cases, the user interface 230 may comprise a modeling tool in which the user inputs the requests in a predefined model environment. In other cases, the user interface 230 may be a design time environment for business computerized processes. Such definitions may be inputted in the form of a process model, in a specific process model language, such as Business Process Model Language (BPML). Business Process Modeling Notation (BPMN) module, a graphic process representation tool, and the like.

The computerized environment 200 further comprises an extension unit 240. The extension unit 240 receives data concerning the process to be extended, such as extension points. The extension unit 240 further receives data concerning events that may trigger the operation of computerized extensions. When an extension is defined, the extension unit 240 may be configured with the process model that defines the execution semantics of the extension. The extension unit 240 may also be configured with the event that triggers execution of the extension. When the computerized application runs, it sends events to the matching unit 130 which may match those events to extensions and execute the extensions that relate to a specific event.

The extension unit 240 identifies the occasion in which computerized extensions are required. The extension unit 240 further associates such computerized extensions with processes or applications that require extensions. The extension unit 240 may further send requests to external entities such as storage device 250 and extension server 255. The external entities may store data concerning the computerized extensions, such as the extensions themselves, processes to which the extensions may fit and the like. The external entity may be a computer 260 running another application.

Figure 3:
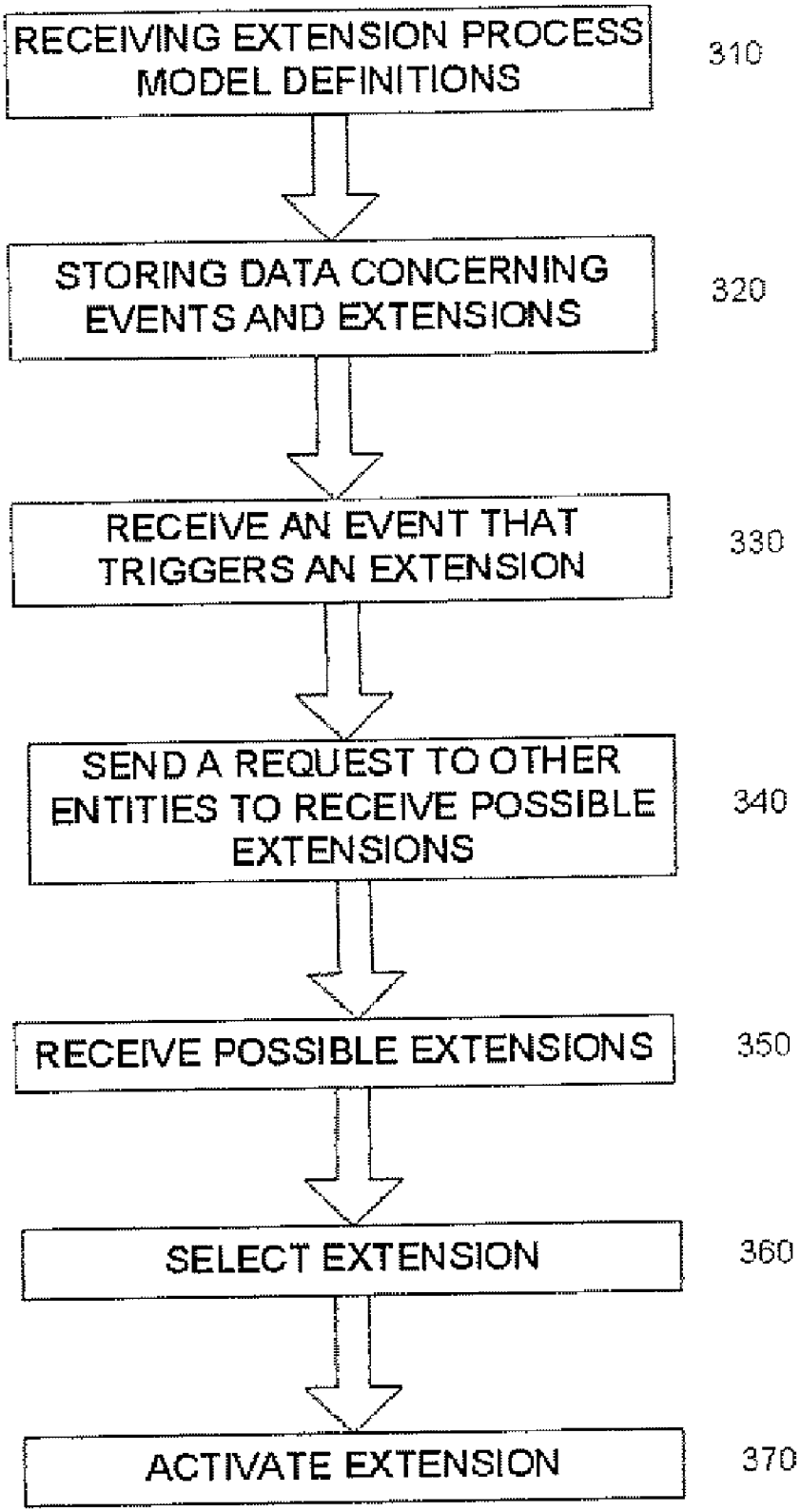

FIG. 3 shows a flow of a method for extending computerized processes, according to some exemplary embodiments of the disclosed subject matter. In step 310, a computerized entity that handles the extension receives data concerning the desired extension. Such computerized entity may be a computer on which the process runs or a server handling extensions and send the proper extension to the proper entity on which the process runs. The data concerning the desired extension may be received from a user defining or modeling a process on the customer side. The data concerning the extension may also be received from a computerized mechanism that detects a need to extend the process. The data concerning the desired extension may be received in a process model form, without relating to technical requirement, but only to the general functionality of the process and the desired extension. The extension does need not be concerned with an underlying extension mechanism. The data concerning the desired extension may comprise one or more extension points that refer to the extension, the functionality of the extension, the process to which the extension relates, an event that triggers the operation of the extension, the task performed after executing the extension and the like. In some exemplary embodiments, a computerized extension is merged into the computerized application, for example by synchronizing with the computerized application after the application is complete. The computerized extension may perform said merge using an extension point, thus, indicating the computerized application state as a parameter indicating when to merge back, for example the progress of the corresponding process model. Technically, the computerized extension sends out an event which is received by the computerized application at the point where the synchronization is supposed to take place.

In step 320, the received data is stored in a storage device connected to or comprised in the computerized entity that handles the method disclosed herein. Such storage device may also be an adaptive extension repository, holding records on extensions, events and the like.

In step 330, the computerized entity receives an event. Such event is associated with one or more extension points. The event triggers can be thrown or caught from within business process variants such as processes and running in a business application suite. The event can be any message or data received from another process.

In step 340, the computerized entity sends a request to other entities to receive possible extensions. Such request may be transmitted via the internet, a business intranet, via processes in the same computer and the like. A list of possible entities may reside in a storage unit connected to or comprised within the computerized entity. Alternatively, the extension unit such as 240 of FIG. 2 that handles the extension method stores the data concerning the functionalities of extensions stored in various external entities and determines to send the request only to a portion of the external entities, for example based on evaluating business rules.

In step 350, the extension unit receives one or more extensions to be added to the desired process.

In step 360, the extension unit selects one of the extensions it received. In step 370, the extension unit runs the selected extension. Some of the steps disclosed in the flow of FIG. 3 may be optional.

The method disclosed above may be performed by an application that operates on a customer's computer, or at a backend server of an extension provider. One of the technical effects of the disclosed subject matter is the separation of concerns between the computerized application and the computerized extensions. According to the method disclosed above, the entity that handles processes and applications is not required to handle the extensions, as opposed to prior art configurations.

The technological gap between the environments of the extensions and the applications may be solved by exposing a public interface, for example a plurality of web services. Such public interface can be accessed from the computerized extension to exchange data and manipulate the activation of the computerized application. In some exemplary embodiments, the extension unit further receives metadata concerning activation of the computerized extensions. Such metadata may later be used in selecting the appropriate extension or in creating middleware software to bridge between the extension and the application.

It should be noted that the disclosure above refers primarily to events as the technical means to trigger computerized extensions. In practice, other technologies are can also be used to provide the same, including "application exits" or other portions in the programming code of the computerized application where a customer can insert own pieces of programming code to alter the behavior of the business application.

In some exemplary settings, the to-be-extended core process runs on an ABAP backend whereas its extension runs on a CE (Java) stack, more specifically in a BPMS runtime environment. If the backend application and the extension process are to participate in a joint database transaction, the extension unit may provide an appropriate transaction coupling mechanism. In some exemplary cases, such as asynchronously spawned processes, a reliable messaging protocol such as WS-Reliable Messaging is used to send a message and spawn an extension. In case of synchronously invoked processes, distributed transaction protocols such as two-phase commit (2PC) may be used.

The method and system of the disclosed subject matter are optionally used in a computerized network environment, comprising one or more computing platforms. Each program may be independent and activated by a user, or may be activated by another program or service. Each program can supply one or more services which may require different parameters.

A computing platform used for the methods disclosed above can be a server, a desktop computer, a laptop computer or any other computing platform provisioned with a Central Processing Unit (CPU) and memory and communication interface. Each program, application or service comprises one or more sets of interrelated computer instructions, implemented in any programming language and under any development environment. Each user can access the portal from the computing platform that executes the portal, or from any other computing platform connected through a communication channel such as a Local Area Network (LAN), Wide Area Network (WAN), the Internet, intranet or the like, using any communication protocol.

It will be appreciated by a person skilled in the art that the disclosed system and method are exemplary only and that multiple other implementations can be designed without deviating from the disclosure. Any component or step can be split into a multiplicity of components or steps, while multiple components or steps can be combined into one. It will also be appreciated that further generally known or available components or steps may be required, such as utility components or steps for handling communication, storage, backup, user management, or the like.

It will be appreciated by persons skilled in the art that the present disclosure is not limited to what has been particularly shown and described hereinabove. Rather the scope of the present disclosure is defined only by the claims which follow.

What is claimed is:

1. A method for extending computerized applications, comprising:
   receiving data concerning a computerized extension required by a computerized application;
   detecting an event received from an external entity;
   selecting a computerized extension to be executed according to the detected event from the external entity and the received data concerning a computerized extension; and
   executing the selected computerized extension;
   wherein the computerized extension and the computerized application are formulated as business process models to overcome technical gaps between the computerized application and the computerized extension;
   wherein the event represents a progress or state of the computerized application and is linked to a process model documentation in a way that the event refers to a specific step or a plurality of steps in the business process models;
   wherein the method is performed by a general purpose processor.

2. The method of claim 1, wherein the computerized extension is executed after a computerized process used by the computerized application that requires the computerized extension is terminated.

3. The method of claim 1, wherein the computerized extension is executed before operation of a computerized process used by the computerized application that requires the extension.

4. The method of claim 1, wherein the computerized extension is executed during operation of a computerized process used by the computerized application that requires the extension.

5. The method of claim 1, wherein the external entity is a business application.

6. The method of claim 1, further comprises a step of sending a request for the computerized extension to the external entity according to the received data concerning a computerized extension.

7. The method of claim 1, further comprises a step of receiving technical metadata concerning execution of the computerized extension, and applying said technical metadata in overcoming a technological gap between the computerized application and the computerized extension.

8. The method of claim 1, wherein the event is an extension point in the computerized application.

9. The method of claim 6, further comprises a step of receiving more than one potential computerized extensions and further comprises a step of matching the computerized extension to the event.

10. A system for enabling computerized extensions, comprising
    a first receiving module for receiving data concerning a computerized extension required by a computerized application;
    a first receiving module detecting an event that triggers the computerized extension;
    a selection unit for selecting a computerized extension to be executed according to the detected event and the received data concerning a computerized extension;
    wherein the computerized extension and the computerized application are formulated as business process models to overcome technical gaps between the computerized application and the computerized extension;
    wherein the event represents a progress or state of the computerized application and is linked to a process model documentation in a way that the event refers to a specific step or a plurality of steps in the business process models; and
    a running unit for executing the selected computerized extension.

11. The method of claim 1, further comprises receiving events which are raised by the computerized applications upon reaching a certain progress within the corresponding process model, for example reaching an extension point.

12. The method of claim 1, further comprises a step of modeling the computerized application into the business process model.

13. The method of claim 1, wherein the extension point represents the combination of a business process model, such as a documentation of the business application that is to be extended, and an event associated to a specific step or multiple steps in that business process model.

14. The method of claim 1, wherein the computerized extensions are added to computerized process models that document and represent the computerized applications.

15. The system of claim 10, further comprises a user interface and a modeling tool in which the user inputs requests in a predefined model environment, wherein the user interface is a design time environment for business computerized processes.

16. The system of claim 10, further comprises an extension unit configured with the process model that defines execution semantics of the extension.

17. The method of claim 1, wherein the data concerning the computerized extension may be received in a process model form, without relating to technical requirement, but only to the general functionality of the process and the desired extension.

* * * * *